June 5, 1962 — C. M. MINKE — 3,037,380

FORCE MEASURING INSTRUMENT

Filed Oct. 15, 1958

INVENTOR
Charles M. Minke
BY Stevens, Davis, Miller & Mosher
ATTORNEYS

3,037,380
FORCE MEASURING INSTRUMENT
Charles M. Minke, Cumberland, Md., assignor to Allegany Instrument Company, Inc., Cumberland, Md., a corporation of Maryland
Filed Oct. 15, 1958, Ser. No. 767,306
1 Claim. (Cl. 73—141)

This invention relates to an apparatus for measuring off axial force components particularly thrusts of rocket and jet engines.

This application is a continuation-in-part of my co-pending application Serial No. 705,310, filed December 26, 1957, now abandoned.

Rapid advances in rocket and jet engine technology have for some time demanded increasingly refined systems for measurement of thrust components. The present invention now provides designers with a technically valid means for quantitatively instead of qualitatively measuring these off axial thrust components. The invention comprises either one or two specially fabricated ball and socket joints plus a load cell. Each ball and socket joint permits a full five degrees of low friction swing. The invention eliminates force measuring error caused by the bending of transducers resulting from axial malalignment. Such error is prevalent in the prior art systems for measuring thrust. The unique design of the present invention accommodates both parallel axial displacements and angular axial displacements. Angular axial displacement requires only one ball and socket joint while parallel axial displacement requires two such joints. The device provides its user with comprehensive force measurements in the range of 1000 to 500,000 lbs.

The unit was specifically developed to measure thrust and ordinarily will carry a compressive load. However, some thrust components will be in the opposite direction and the unit will be in tension instead of compression. The unit is accordingly designed to measure both loads in tension and compression. Also, the device has utility for measuring forces in general besides thrust measuring applications.

An object of this invention is to provide an improved force measuring apparatus.

A further object of this invention is to provide a force measuring apparatus which prevents error due to axial malalignment.

A further object of this invention is to provide an improved thrust measuring apparatus.

A further object of this invention is to provide an improved force measuring apparatus which is relatively inexpensive.

A further object of this invention is to provide a force measuring apparatus whose parts can be easily repaired or replaced.

A further object of this invention is to provide a force measuring apparatus which prevents error due to angular axial malalignment.

A further object of this invention is to provide a force measuring apparatus which prevents error due to parallel axial malalignment.

The objects and advantages in the present inventions can be better understood with reference to the following drawings.

Figure 1:
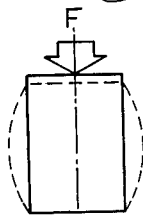
FIGURES 1 and 2 illustrate how transducers used according to the prior art produced erroneous readings of thrust or force components.

During the calibration of a transducer used to measure force or thrust, it is strained as is shown in FIGURE 1. The amount of strain of the transducer and hence the output from the transducer is a function of the force applied to the load cell. The engineer obtains characteristics such as factor, linearity, etc. from the output data obtained during the calibration. These characteristics are then later used to interpret quantitative data during a force measuring application.

Figure 2:
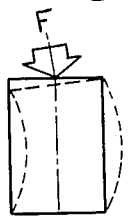

During the measurement, if there is an axial malalignment, as there usually is in thrust measurement, the transducer may be strained as shown in FIGURE 2. In this case it is clear that the output characteristics change because the stress-strain conditions are different. This change is almost never detectable when the transducer is subsequently recalibrated. Hence, an accurate force or thrust reading is not obtained. The design of the instrument of the present invention solves this problem by means of the ball and socket joint. Because of the virtually friction free universal swing of the joint, the surfaces of the transducer are strained during tests as they are during calibration. Two benefits are provided. First, axial malalignment, which can and often does adversely effect the electrical output of the transducer, is accommodated. Secondly, this accommodation permits measurement of thrust components to a higher degree of accuracy than heretofore possible.

Figure 3:
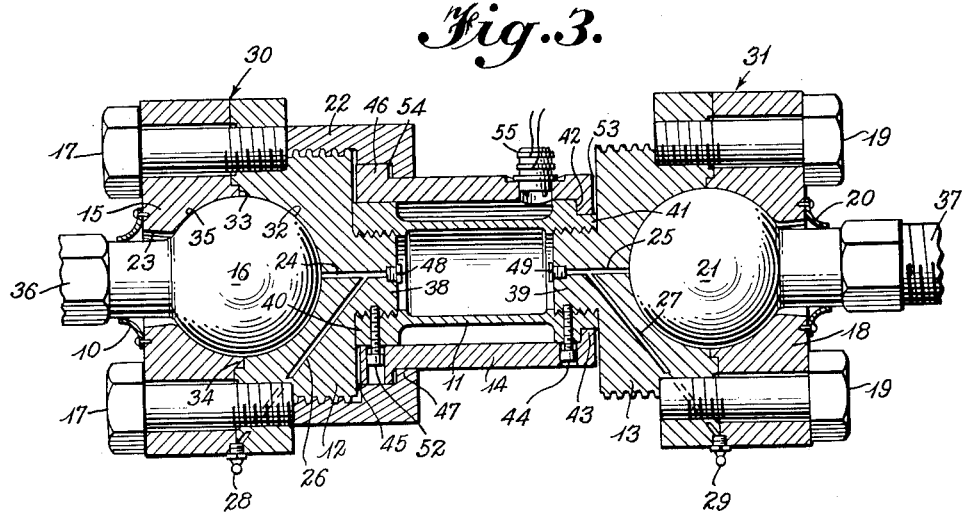
FIGURE 3 illustrates a cross-section of the instrument according to the present invention showing the embodiment utilizing two ball and socket joints.

In FIGURE 3 there is shown the embodiment having two ball and socket joints. As was stated above this embodiment will prevent error due to parallel axial malalignment. The instrument comprises two ball and socket joints indicated generally by the reference numbers 30 and 31. The joint 30 comprises a ball seat 12, a cap 15 and a ball 16. The seat 12 has a hemispherical recess 32 defined therein, and a flange surrounding the recess. The recess 32 has a depressed lip 33. The cap 15 also has a hemispherical recess 35 defined therein. A flared opening 23 passes from the bottom of the recess 35 through the cap 15. The cap 15 fits over the recess 32 and the two hemispherical recesses 32 and 35 cooperate to form a spherical cavity. A raised lip 34 is formed around the edge of the recess 35 and fits within the depressed lip 33 to prevent lateral slipping of the cap 15. Bolts 17, which are threaded into the flange of the seat 12, clamp the cap 15 firmly to the seat 12. The ball 16 fits within the spherical cavity formed by the seat 12 and cap 15. A shaft 36, fixed to the ball 16, passes through the opening 23. A flexible grease seal 10 covers the space between the shaft 36 and the wall of the opening 23. The joint 31 comprises a ball seat 13, a cap 18, a ball 21, bolts 19, a shaft 37, and a grease seal 20, and is constructed exactly as the joint 30.

Between the two joints 30 and 31 is mounted a load cell 11. The load cell 11 is a hollow stress cylinder having a transducer which converts the force, either tensile or compressive, applied to the load cell along its axis into an electrical signal which is a function of the applied force. The load cell is mounted at each end with a screw fit on outwardly extending cylindrical threaded members 38 and 39 of the seats 12 and 13 respectively. The load cell has a collar 40, which butts against the seat 12 around the threaded member 38, and a smaller collar 41, which butts against the seat 13 around the threaded member 39. The collar 41 has a shoulder 42 whose over-all diameter equals that of the collar 40. A cylindrical sleeve 14 fits around the load cell 11 but is spaced from the working part of the cell by the collar 40 and the shoulder 42. A receptacle 55 fits through the sleeve 14 and provides the electrical outlet for the signal produced by the transducer. The sleeve 14 has an inwardly extending flange 43 which loosely fits between the shoulder 42 and the seat 13 leaving a clearance 53 between the flange 43 and the seat 13. Set screws 44 and 52 are threaded through the collars 41 and 40 to the threaded members 39 and 38 respectively locking the load cell in its mounted position. The heads of the set screws 44 and 52 project up into apertures in the sleeve 14. A clearance 45 is provided between the sleeve 14 and the seat 12. A screw cap 22 makes a screw fit with threads tapped around the outside of the seat 12. This screw cap has an inwardly extending flange 47 which fits loosely around an outwardly extending flange 46 of the sleeve 14 leaving a clearance 54. This clearance is shown for purposes of illustration between the flange 46 and the flange 47 but, of course, the sleeve is free to slide and the clearance could be shown between the shoulder 42 and the flange 43.

Grease passages 24 and 25 are provided between the spherical cavity of the joints 30 and 31 and the ends of the threaded members 38 and 39. These passages are closed at the ends of the threaded members 38 and 39 by plugs 48 and 49 respectively. Grease passages 26 and 27 are provided between the exterior of the sockets and the respective grease passages 24 and 25. These passages are closed by removable fittings 28 and 29. The passages are used to lubricate the surfaces between the balls 16 and 21 and their spherical cavities so that virtually frictionless movement of the joint is possible.

Figure 5:
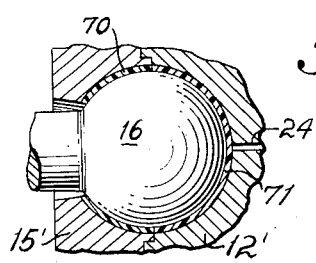
FIGURE 5 is a fragmentary section of the ball and socket showing the use of a liner lubricant.

Lubricants such as molybdenum disulphide can be used to advantage to withstand the high pressures in the ball and socket and as shown in FIGURE 5, a lining of Teflon in the form of two hemispherical members 70 and 71 may be employed to effect a tough frictionless mounting for the ball socket.

When a force is applied along the axis of the shaft 36 and a counteracting force is applied along the axis of the shaft 37, the entire magnitude of these forces will be transmitted through the load cell 11. No force will be transmitted through the sleeve 14. The clearances 45 and 53 prevent the transmission of a compressive force through the sleeve and the clearance 54 prevents the transmission of a tensile force through the sleeve. Hence, the load cell will be subjected to a force equal to the applied forces and the transducer will produce an output which is a function of those applied forces thus indicating their magnitude. The sleeve 14 prevents the load cell from becoming over loaded by the applied forces. When an applied compressive stress exceeds a predetermined minimum the load cell will become so strained that the clearances 45 and 53 contract into nonexistance. Whereupon the excessive compressive force will be transmitted by the sleeve. Likewise, if a tensile force exceeds a predetermined minimum the clearance 54 will shrink into nothingness and the excessive tensile force will be carried by the sleeve. The shafts 36 and 37 during a test are fixed in their radial positions and are only permitted motion in the direction of their axes. When, as in the usual case, these shafts are not exactly collinear, the forces transmitted along them will not be collinear. This malalignment will result in a shear stress but because of free universal movement of the joints 30 and 31 none of this shear stress will be applied to the load cell 11. It will all be applied to the shafts 36 and 37 themselves as the universal joints 30 and 31 will not transmit a shear force. Hence, the load cell is subjected to pure tensile or compressive stress and its transducer gives an output signal which is accurately calibrated. Since there are two ball and socket joints the malalignment can be such that the axes of the applied forces do not even intersect. This type of malalignment is referred to as parallel malalignment. If the malalignment is such that the axes of the applied forces do intersect then only one of the joints is needed. This kind of malalignment is referred to as angular malalignment.

Figure 4:
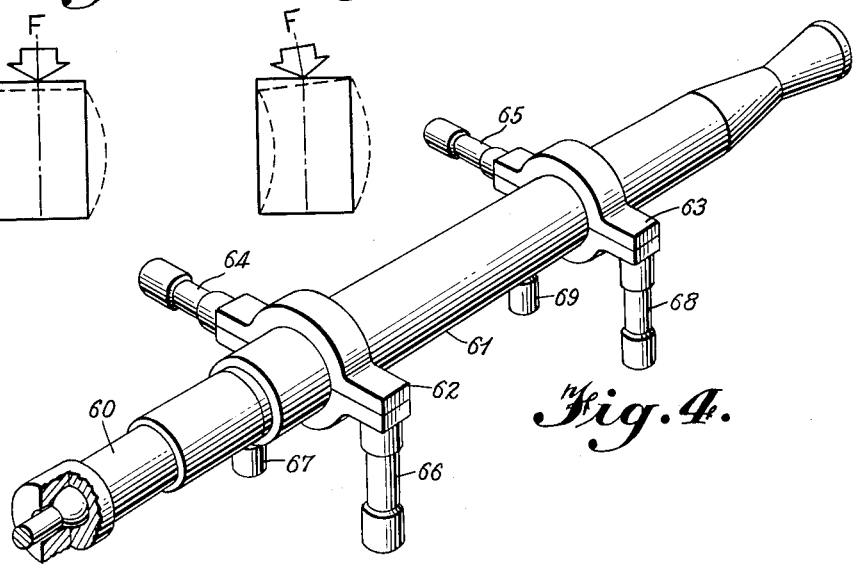
FIGURE 4 shows the use of the instrument according to the present invention mounted for measuring the thrust components of a canted nozzle rocket.

In FIGURE 4 instruments are shown mounted for measuring the thrust components of a canted nozzle rocket. It is in such application that the virtually friction free swing of the joints provides the greatest benefits. Because of this free movement the surface of the transducer is strained in exactly the same manner it is strained during the thrust measuring operation. One instrument is indicated generally by the reference number 60. It is mounted on the front of the rocket 61 to bear the main thrust produced by the rocket. The rocket 61 is supported by the braces 62 and 63, which are each supported by two of the instruments 66 and 67 and 68 and 69 respectively. The rocket is braced against horizontal motion by two more instruments 64 and 65. The forward thrust measuring instrument 60 is illustrated partly broken away to show one of the ball and socket joints. The shaft attached to the ball is mounted against a fixed support so that when the rocket generates its thrust an equal and opposite resulting force will be transmitted along this shaft. Accordingly, the load cell will then be put in compression and its transducer will produce a signal indicating the magnitude of the thrust. Because of the free movement of the ball and socket joints this compression will be pure compression in spite of malalignment and accordingly the produced signal will be accurate. Similarly, all additional thrust components will be accurately measured by units 64 through 69. Some of these units may be put in tension instead of compression depending on the direction of the thrust component. If the malalignment is only angular then either the joint attaching the cell to the rocket or the joint attaching the cell to the fixed support may be eliminated and obvious structure substituted for the joint.

The above description is intended to present a specific embodiment of the invention and it may be modified without departing from the spirit and scope of the invention which is to be limited only as defined in the appended claim.

What is claimed is:

A thrust measuring device for rocket engine test stands and the like comprising a load cell having an axis, said load cell comprising an internal sleeve surrounding the axis, a transducer mounted on said internal sleeve to indicate the force transmitted by said load cell in the direction of the axis, an external sleeve having flanges on each end surrounding said internal sleeve, socket means inserted in and secured to the ends of said internal sleeve and including surfaces slightly separated in the axial direction from the flanges on said external sleeve, whereby said external sleeve prevents said load cell from becoming overloaded by applied forces, balls fitting within said socket means, stems attached to said balls to transmit loads to said socket means, and cap means to retain said balls in said socket means.

References Cited in the file of this patent

UNITED STATES PATENTS

| | | |
|---|---|---|
| 1,989,116 | Strauss | Jan. 29, 1935 |
| 2,491,508 | Mann | Dec. 20, 1949 |
| 2,600,701 | Statham et al. | June 17, 1952 |
| 2,699,063 | Rogers | Jan. 11, 1955 |
| 2,761,670 | Fouretier | Sept. 4, 1956 |
| 2,775,887 | Hines | Jan. 1, 1957 |
| 2,846,252 | Herbenar et al. | Aug. 5, 1958 |
| 2,878,047 | Booth | Mar. 17, 1959 |
| 2,906,573 | Runton | Sept. 29, 1959 |